United States Patent
Tuma

(10) Patent No.: US 9,781,960 B2
(45) Date of Patent: *Oct. 10, 2017

(54) SUPPORT DEVICE

(75) Inventor: Jan Tuma, Herrenberg (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 1131 days.

This patent is subject to a terminal disclaimer.

(21) Appl. No.: 13/261,201

(22) PCT Filed: Oct. 5, 2010

(86) PCT No.: PCT/EP2010/006081
§ 371 (c)(1),
(2), (4) Date: Mar. 5, 2012

(87) PCT Pub. No.: WO2011/047786
PCT Pub. Date: Apr. 28, 2011

(65) Prior Publication Data
US 2012/0167274 A1  Jul. 5, 2012

(30) Foreign Application Priority Data
Oct. 24, 2009 (DE) .................. 10 2009 050 586

(51) Int. Cl.
*A41D 19/015* (2006.01)
*B29C 49/00* (2006.01)
(Continued)

(52) U.S. Cl.
CPC .... *A41D 19/01558* (2013.01); *B29C 33/0027* (2013.01); *B29C 43/222* (2013.01); *B29C 33/424* (2013.01)

(58) Field of Classification Search
CPC ............... A41D 13/082; A41D 13/087; A41D 19/01547; A41D 19/01558;
(Continued)

(56) References Cited

U.S. PATENT DOCUMENTS 207,708 A * 9/1878 Boyer .......................... 294/25
1,559,114 A * 10/1925 Maranville ................. 15/227
(Continued)

FOREIGN PATENT DOCUMENTS

DE    G9308338.6 U1    9/1993
DE    299 19 345       1/2000
(Continued)

*Primary Examiner* — Dean Kramer
(74) *Attorney, Agent, or Firm* — Wenderoth, Lind & Ponack, L.L.P.

(57) ABSTRACT

A support device for improving the haptics and/or gripping impression of humanoid or android type hands includes an active surface that interacts with parts (16, 18, 22) of the respective hand to carry out a movement and that has individual stem-like projections. Each projection has a free end face such that the projections at least partially improve the adhesion of at least parts of the hand or a hand protector (10) to surfaces, particularly smooth or delicate surfaces, that are touched. The respective free end faces (26) of the projections (24) are designed such that their adhesion results from acting van der Waals forces between the free end faces (26) and the touched surface.

19 Claims, 3 Drawing Sheets

(51) Int. Cl.
*B29C 33/00* (2006.01)
*B29C 43/22* (2006.01)
*B29C 33/42* (2006.01)

(58) Field of Classification Search
CPC .......... A41D 19/01564; A41D 2400/80; B29C 33/0027; B29C 33/424; B29C 43/222; B29L 2031/4864
USPC .......... 294/25, 902; 2/21, 160, 161.3, 161.8, 2/167, 169
See application file for complete search history.

(56) References Cited

U.S. PATENT DOCUMENTS

| | | | |
|---|---|---|---|
| 2,187,430 A * | 1/1940 | Olmsted et al. | 2/168 |
| 3,500,477 A * | 3/1970 | Meszaros | 2/161.8 |
| 4,270,228 A * | 6/1981 | Gaiser | 2/158 |
| 4,691,387 A * | 9/1987 | Lopez | 2/161.3 |
| 4,793,005 A * | 12/1988 | Hetzel, Jr. | 2/161.1 |
| 5,419,014 A * | 5/1995 | Piantedosi | 15/227 |
| 6,081,928 A | 7/2000 | Bourne | |
| 6,839,905 B1 * | 1/2005 | Bruder et al. | 2/21 |
| 8,007,892 B2 * | 8/2011 | Tuma | 428/99 |
| 2004/0025224 A1 | 2/2004 | Albert | |
| 2005/0278827 A1* | 12/2005 | Price et al. | 2/158 |
| 2006/0282936 A1 | 12/2006 | Olson et al. | |
| 2007/0063375 A1* | 3/2007 | Tuma | 264/166 |
| 2008/0201823 A1 | 8/2008 | Jaeger | |
| 2011/0271496 A1 | 11/2011 | Tuma | |

FOREIGN PATENT DOCUMENTS

| | | |
|---|---|---|
| DE | 10 2004 012067 | 10/2005 |
| WO | WO 03/059108 * | 7/2003 |
| WO | 2008113816 | 9/2008 |

* cited by examiner

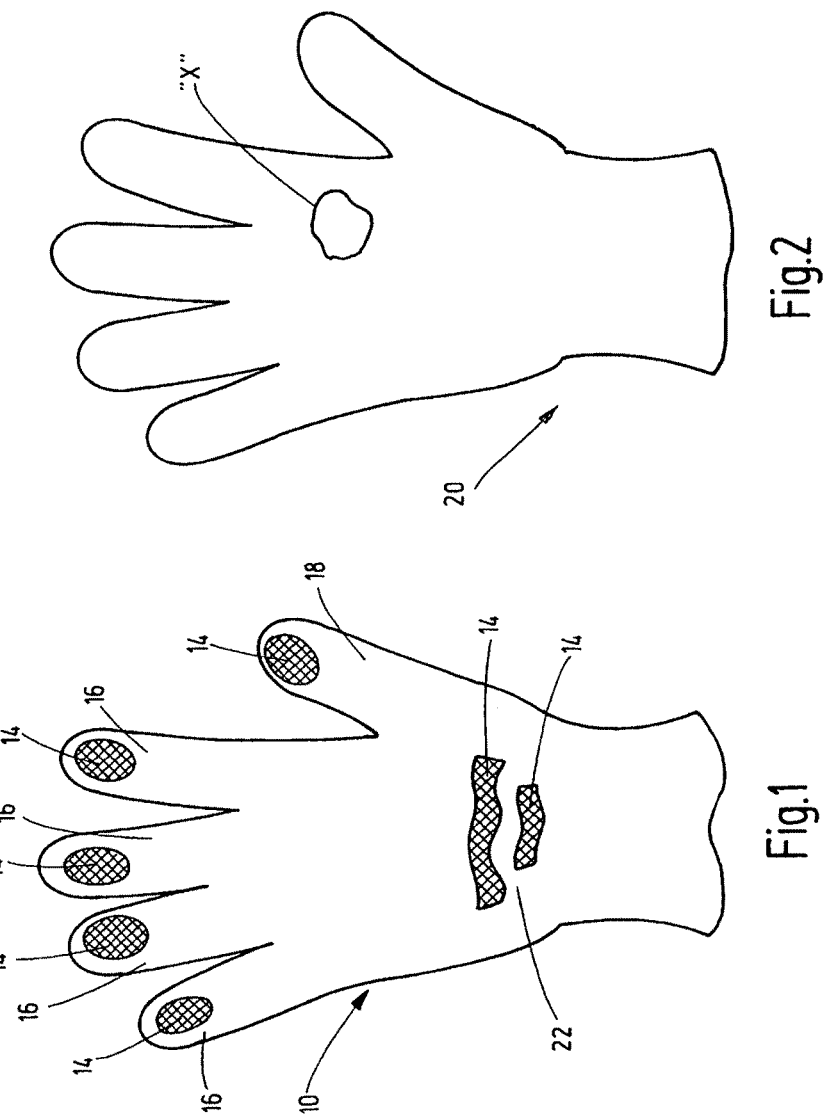

SUPPORT DEVICE

FIELD OF THE INVENTION

The invention relates to a support device for improving the haptics and/or gripping impression for hands when touching surfaces that are especially smooth and/or delicate.

BACKGROUND OF THE INVENTION

When touching smooth and/or delicate surfaces, for executing a movement, for example, by bare human hands or by the hands of a robot, there is the risk of an inadvertent relative movement between the surface and the hand touching it. This relative movement, for example, in the case of an article grasped by the hand can lead to its slipping out of the hand and the article being damaged in a subsequent and uncontrolled movement. Especially for delicate surfaces, reliable handling cannot be achieved by simple measures such as, for example, increasing the force acting on the article touched by the hand, since increased force can result in damage of a delicate surface.

WO 2008/113816 A2 discloses a support device (glove) for improving the grasping impression for hands with an active surface that interacts with parts of the respective hand for executing a movement and has individual cup-shaped projections. The free ends of the cup-shaped projections are each provided with a kind of microcrater whose crater opening discharges into the open. If, under the action of force or pressure, the cup-shaped projections come into contact with a corresponding article, the respective crater opening coming into contact is folded down. The cup-like projection then forms a kind of widening plate edge that, for improved adhesion of the projection to the indicated article, leads to an increase of friction. In addition, the known solution is used to assist an operator owing to an increased damping action caused by the microcrater structure in the projections.

U.S. Patent Publication No. 2008/0201823 A1 also discloses a comparable solution in which, for the purpose of roughening the active surface of the support device (glove), pyramid-like projections are on the support surface to increase the friction between these projections and an article to be handled.

Another representative of this glove solution is disclosed in German Utility Model 93 08 338, in which triangular or cup-shaped projections are integrally connected to the surface material of a work glove. The work glove material is of a watertight material, especially of an elastic material such as rubber or the like. The work glove outfitted in this way is especially well suited to the household for cleaning and peeling potatoes, carrots, or the like by rubbing.

Another type of support device is formed by the gloves according to U.S. Pat. No. 6,081,928 A and U.S. Patent Publication No. 2006/0282936 A1. These known glove solutions on their top have suction cup-shaped projections that, when touching an article, apply a suction action to the article and thus, effect adhesion by a vacuum.

The disadvantage in these known solutions is that to some extent only inadequate adhesion occurs between the support device and the article to be touched and that the projections in part project far from the support device. These characteristics adversely affect the ease of operation. Furthermore, the known solutions are to some extent complex to produce, and therefore expensive.

SUMMARY OF THE INVENTION

An object of the invention is to provide a support device improving the haptics and/or a gripping impression in hands of the humanoid or android type that, especially when touching smooth and/or delicate surfaces effectively prevent an inadvertent relative motion between the hand and the surface, while avoiding the above-described disadvantages.

This object is basically achieved by a support device having the respective free end faces of the projections designed such that their adhesion takes place by van der Waals forces acting between the free end faces and the respective surface. Unintentional relative movements between the respective surfaces and the hand touching them are effectively prevented. Neither friction-enhancing projections nor those projections that generate a suction cup action (vacuum) are necessary for the interaction of the support device and the respective other component. The adhesion is very gentle since the effect of adhesion by van der Waals forces of at least parts of the hand or of the hand protection on the surfaces after touching them is only insignificantly determined by a force to be applied by the hand or the hand protection. The use of the support device according to the invention then appears to be suitable especially for very delicate surfaces.

So that the molecular van der Waals forces can act between the respective free end faces of the projections and the respective surface, as large a number of the free end faces of the projections as possible should make contact with the respective surfaces since the van der Waals forces very quickly decrease with the increasing distance of the end face from the respective surface. As indicated in the literature, the van der Waals forces decrease depending on the distance r of the end face from the respective surfaces by $1/r^6$.

The length of the projections is preferably chosen such that they discharge or end with their respective free end face in a common plane so that preferably the distance of the free end faces of the projections to the surface to be touched is essentially constant, and that simultaneously adjacent free end faces can be moved into adhesive contact with the surface.

In one embodiment of the support device according to the invention, at least the end faces of the projections of the active surface are formed from an oleophobic material that adheres without residue, especially from polyvinyl siloxane. Polyvinyl siloxane is not combustible, can be used at temperatures over 150° C., and is heat-insulating. This material is favorable especially when touching hot surfaces. For example, in the handling of semiconductor wafers and optical glasses, due to the required high level of cleanliness of the surfaces of these materials, the residue-free adhesion of the end faces of the projections is advantageous. In the laboratory and in surgery, the support device according to the invention can also be used for reliable handling of instruments that are often provided with smooth surfaces. In the laboratory, the support device can also be effectively used for moving articles with a smooth surface. For example, by a simple "tapping" of the surface of smaller articles with the active surface, sufficient adhesion can be achieved to be able to move these articles in the desired way in a controlled manner.

At least for the end faces of the projections, addition-crosslinking silicon elastomers, acrylates, or even rubber can be used alternatively or in addition as other materials.

According to the invention, the projections each have a head part that, borne by a stem part, on the end face can have a contact surface that at least partially adjoins the surface in the adhesion of at least parts of the hand or of the hand protection. The formation of the head part on the stem part promotes the equalization of at least small irregularities of the touched surface since the respective head part can be aligned matched to the local geometry of the surface located opposite thereto, at least to a limited degree. The support device according to the invention can also be provided for this purpose that, between the head part and the stem part of the projection, has at least one articulated part supporting these matching processes even further.

Both round and also polygonal shapes, especially hexagonal cross-sectional shapes, have proven suitable for the cross-sectional shape of the head part. When the head part approaches a surface, it can make contact with the surface first with its edge region.

According to the invention, the projections can regularly or irregularly arranged on a backing with a surface density from 10,000 to 60,000, preferably from 20,000 to 45,000, and especially preferably of approximately 30,000 projections per square centimeter of the surface of the backing. The van der Waals forces that are active between the free face surfaces of the projections and the respective surface are very small. However, with a surface density of the projections that is as high as possible, the resulting sum of the individual contributions of the projections of the active surface to adhesion achieves surprisingly high values.

In the support device according to the invention, the projections for forming the active surface can be borne by the backing, which backing integrally adjoins the side of the projections opposite the free end face or formed by a surface of at least parts of the hand or of the hand protection. If the backing integrally adjoins the side of the projections opposite the free end face, both a reliable mounting of the projections on the backing is ensured. Also, this execution allows a simple matching of the dimensions of a backing provided with projections to the requirements of the respective support device such as, for example, by cutting to size or punching out. The backing can also be formed, for example, by surfaces of at least part of the hand, especially of a hand of the android type, for example, the hand of a robot, on which the projections are attached by suitable joining methods, such as, for example, cementing or bonding. In this solution, only selective regions of the hand with projections in a controlled manner can be provided. That solution also applies to the case in which the backing is formed by a surface of at least parts of the hand protection.

In the support device according to the invention, the backing can be made in the form of a film. Depending on the application, the backing can be made elastic or even non-elastic. An elastic execution of the backing, especially in a support device for hands of a humanoid type, has the advantage that in any case the fine motor capabilities of the hand are not restricted in this way. Furthermore, an elastic execution of the backing also allows extensive adaptability of the active surface to the local geometry of the surface to be touched.

In the support device according to the invention, the film can be joined to parts of the hand or of the hand protection by an adhesive bond, especially using an acrylate cement.

In the support device according to the invention, pieces of film can be arranged on selective regions of the hand or of the hand protection and can be isolated from other pieces of the film. In this way, those regions of the hand or of the hand protection that are intended for touching surfaces on which adhesion is desired, can be provided in a controlled manner with pieces of film. Furthermore, regions, especially regions of joints of the hand, may specifically not be provided with the film to maintain the highest possible degree of mobility for a hand protection or a hand.

In the support device according to the invention, at least one piece of film can be located in each of the regions of the fingertips on the inside of the hand or of the hand protection. For the movement of delicate surfaces by a hand, especially the region of the fingertips for a hand of the humanoid type is of special importance since in humans the sensory capabilities are highly pronounced here. Therefore, especially fingertips or the distal phalanges of the respective fingers located on the inside of the hand are especially well suited to be provided with one or more pieces of film at a time to achieve, in particular, increased adhesion to the surfaces to be handled.

In the support device according to the invention, at least one piece of film can be on the palm of the hand, especially in the region of the ball of the thumb. This arrangement of at least one piece of film is especially useful when the ball of the thumb comes into contact with the surface in a supportive manner. A combination of film pieces, both in the region of the fingertips and also in the region of the ball of the thumb can be provided. In this way, a mutually reinforcing action of the support device can be achieved. If the assigned regions of the fingertips and the assigned region of the ball of the thumb are located each on opposite sides of the surface due to a corresponding grasping motion of the hand, the projections of the support device are in contact on both sides of the surface and allow reliable movement of the grasped article.

In the support device according to the invention, one piece of film can be on the back of the hand, especially in the region of the fingers. An arrangement on the back of the hand, especially in the region of the fingers, supports the avoidance of a relative movement if the finger regions provided with film pieces are in contact with a smooth and/or delicate surface. This arrangement can be effectively used, for example, in gloves for bobsledders. When a bobsledder in the starting process supports himself on the smooth surface of the ice channel with correspondingly equipped gloves as hand protection, he can execute a powerful pushing-off movement while maintaining adhesive contact of the fingers of the clenched fists with the surface of the ice channel, and thus, can effectively facilitate an advancing motion of the bobsled.

In the support device according to the invention, the support device in the form of a glove for a humanoid hand can be made entirely from the film formed into the shape of a glove particularly by a blow molding process. Gloves formed entirely from the film can be economically produced in one step. These gloves, on all regions of their surface, are also provided with the advantageous possibility of increasing an adhesion to surfaces and can then be used in a versatile manner. Furthermore, these gloves can also be used as "glove liners," that are used, for example, in gloves for snowboarders in which an outer glove can be slipped over the glove liner. The support device according to the invention in the form of the glove liner ensures that inadvertent relative motion between the outer glove and the glove liner is not possible since the inside of the outer glove adheres to the outside of the glove liner provided with the stem-like projections. The snowboarder is provided with a reliable gripping impression and haptics. This arrangement constitutes a distinct advantage during sudden gripping processes or support processes in hazardous situations. Of course, the latter application can also be reversed, in which the inside of the outer glove forms the support device according to the invention and can be moved into adhesive contact with the glove liner.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a front elevational view of a hand protection from the inside, provided with the support device according to a first exemplary embodiment of the invention;

FIG. 2 is a front elevational view of a hand protection provided with the support device according to a second exemplary embodiment of the invention;

DETAILED DESCRIPTION OF THE INVENTION

Figure 3:
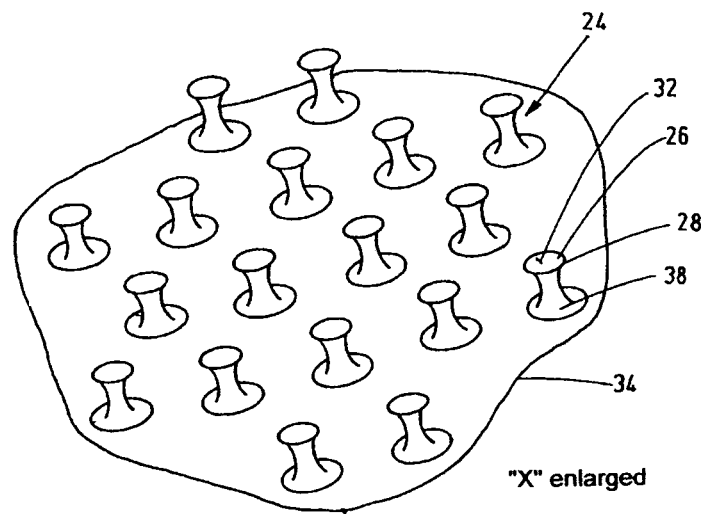
FIG. 3 is a highly enlarged perspective view of the extract of the support device designated as X in FIG. 2.

The support device according to the invention for improving the haptics and/or a gripping impression in hands of the humanoid or android type has an active surface that interacts with parts of the respective hand for performing a movement. In the glove shown in FIG. 1 for a humanoid hand as hand protection 10, the pertinent active surface is formed on the regions 14 shown by crosshatching in FIG. 1. FIG. 1 here shows the inside of the hand of a glove for a right hand. The regions 14 that form the active surface are located on the sections of the hand protection 10 that cover the tips of the fingers 16, the thumbs 18, and the ball 22 of the thumb. The support device has individual stem-like projections 24 (see FIG. 3). The projections with their respective free end faces 26 at least partially improve the adhesion of at least parts of the hand protection 10 to surfaces when they are touched, especially surfaces that are smooth and/or delicate.

The end faces 26 of the projections 24 of the active surface, which end faces are shown in FIG. 3, are formed from a water-repellent material that adheres without residue, especially from polyvinyl siloxane. FIG. 3 is an enlargement, not to scale, of the extract designated as X in FIG. 2, but also depicts the structure of the regions 14 identified by crosshatching in FIG. 1. For the sake of a simplified representation, the mutual distance of the projections 24 in FIG. 3 is shown greater than in the practical version. The projections 24 each have a head part 28 borne by a stem part 30. Each head part 28 has on the end face one contact surface 32 that at least partially adjoins the surface (not shown) when at least parts of the hand or of the hand protection 10 are in adhesion.

The projections 24 are arranged regularly as in the exemplary embodiment according to FIG. 3, or irregularly on a backing 34, and have a surface density from 10,000 to 60,000, preferably from 20,000 to 45,000, and especially preferably of approximately 30,000 projections per $cm^2$ of the surface of the backing 34. For forming the active surface, the projections 24 are borne by the backing 34 integrally adjoin the side 36 (see FIG. 4) of the projections 24, which side is opposite the free end face 26. The backing 34 can also be formed by a surface of at least parts of the hand of an android type, for example, of a robot, or of the hand protection 10.

The backing 34 is preferably made as a film that can also be stretchable and otherwise can adapt well to the contour of a hand. Thus, the film-like support device can be modeled on a thimble of at least one fingertip to be used in this way, when drawn onto a finger, to isolate small parts such as, for example, postage stamps or the like.

Figure 4:
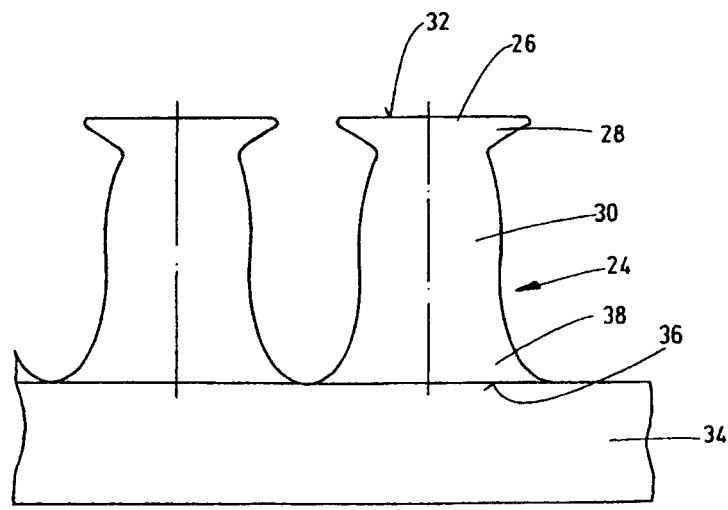
FIG. 4 is a side elevational view of an active surface with the stem-like projections of FIG. 3.

FIGS. 3 and 4 show different embodiments for the stem-like projections 24. The projections 24 according to FIG. 3 between the head part 28 that has been widened relative to the stem part 30 and a foot part 38 that has been widened relative the stem part 30, viewed in a longitudinal section, have a continuously concave path, for example, in the form of a hyperboloid. In the version according to FIG. 4, proceeding from the widened head part 28 in the direction of the foot part 36, viewed in the longitudinal section, first is a convex path of the stem part 30 into a concave path in the vicinity of the foot part 38 in the area of transition onto the backing 34.

The backing 34, made as a film, can be connected to parts of the hand or of the hand protection 10 by an adhesive bond, especially using a double-sided adhesive tape. On its side facing the backing 34, the tape has a silicone cement separated via a film-like polyester separating layer from an acrylate cement that ensures adhesion to parts of the hand or parts of the hand protection.

The backing 34 in the form of the film can be easily isolated into pieces of film and can then be located on selective regions of the hand or of the hand protection 10. In this way, the regions 14, shown crosshatched in FIG. 1, can be provided with film pieces of corresponding shape.

The support device shown in FIG. 2, in the form of a hand protection 20 executed as a glove for a humanoid hand, is made entirely from the film brought into the shape of a glove especially by a blow molding process. The extract identified in FIG. 2 with "X" is shown enlarged in FIG. 3. The glove on its entire outer surface has the same structure as in the section "X." FIG. 2 also shows a glove for a right hand, looking at the inside of the hand.

The arrangement shown in FIG. 1, in which the hand protection 10 is provided with film pieces in discrete regions 14, is of course also suitable for retrofitting of existing gloves. The gloves, for the most varied fields, such as medicine, industrial production, sports activities such as snowboarding, bobsledding, or diving, are already provided with properties that are especially suitable for these purposes. These gloves can be provided with improved adhesion to surfaces when they are touched by the support devices according to the invention.

Figure 5:
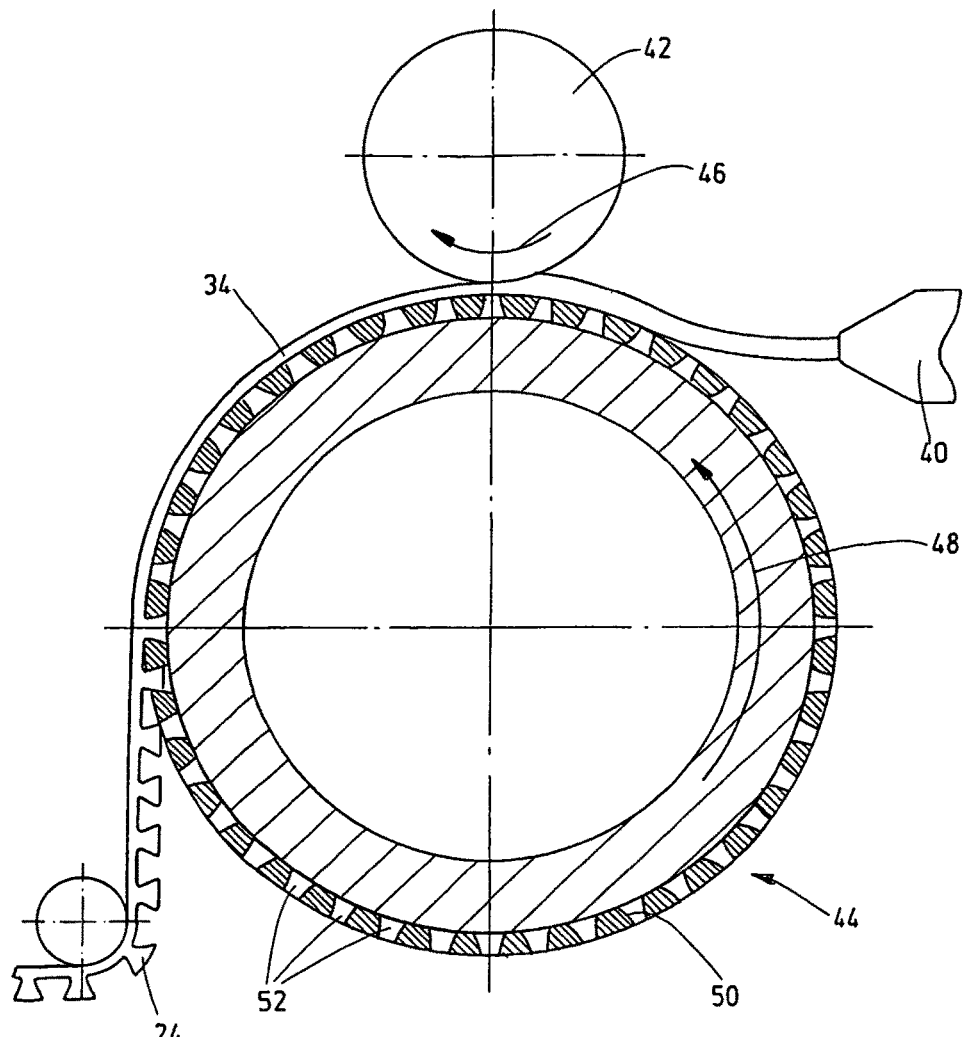
FIG. 5 is a schematic side elevational view of the essential parts of a production device for the production of the support device according to an exemplary embodiment of the invention.

FIG. 5 schematically shows parts of a device for producing the film for a support device according to the invention. A nozzle head 40 is a supply device for plastic or liquid as well as thixotropic plastic that, as a strip whose width corresponds to that of the film to be produced, is supplied to the gap between a compression tool and a molding tool. The compression tool is a pressure roll 42. The molding tool is a molding roll 44.

The two rolls are driven in the directions of rotation indicated in FIG. 5 by arched arrows 46 and 48 so that between them a delivery gap is formed through which the plastic strip is conveyed in the direction of transport. At the same time in the gap as a shaping zone, the plastic strip is molded into the backing 34, and the backing 34 on the side adjoining the molding roll 44 acquires the shape necessary for forming the stem-shaped projections 24 by the shaping elements of the molding roll 44. For this purpose, the molding roll 44 on the periphery has a screen 50 with individual mold cavities 52. The distribution and the number of mold cavities 52 can be selected, but preferably there are more than 10,000 of these mold cavities 52 per cm$^2$ on the screen. A number of approximately 30,000 mold cavities 52 per cm$^2$ has proven especially favorable for the shaping of the stem-like projections 24.

The configuration of the longitudinal section of the mold cavities 52 used at the time can be matched to the respective demands on the stem-like projections 24. For example, the shapes of the stem-like projections 24 shown in FIGS. 3 and 4 can be produced by the illustrated device. To the extent the materials are crosslinkable plastics, a heat source or UV light (not shown) can enable secondary crosslinking as soon as the film with the stem-like projections 24 has been removed from the mold cavities 52.

To obtain optimum van der Waals forces, the contact surfaces 32 of the head parts 28 extend planar to the outside. To obtain planar head parts, a device within the molding roll 44 allows air to escape or enables suction of air in the mold cavity 52, for example, via a vacuum device or the like.

Alternatively to the illustrated production method, the backing 34 provided with the stem-like projections 24 can also be produced by other methods, such as, for example, by a coating device. In this case, the stem-like projections 24 are deposited without a molding tool on the backing 34 by droplets delivered in succession by the coating device. The nozzle of the coating device used, from which plastic materials are sprayed with a droplet size of a few picoliters, can be actuatable, for example, piezoelectrically or electrothermally. Since this nozzle can move in all three directions of space relative to the backing 34, a large plurality of shapes (not shown) for the stem-like projections 24 can be produced by this method.

While various embodiments have been chosen to illustrate the invention, it will be understood by those skilled in the art that various changes and modifications can be made therein without departing from the scope of the invention as defined in the appended claims.

What is claimed is:

1. A support device for improving haptics and/or gripping impressions of humanoid and android hands, comprising:
   an active surface interacting with parts of a hand for executing movements and having stem-shaped projections extending from a backing with widen head parts on ends of said projections remote from said backing, each said projection having a convex part turning into a concave part in a vicinity of a foot part of each said projection in a transition area into said backing in longitudinal section and in a direction proceeding from said head part to said foot part of each said projection; and
   free end faces of said head parts at least partially improving adhesion of at least parts of a hand or hand projection to engaged surfaces that are at least one of especially smooth and delicate when touched, said free end faces being formed to provide van der Waals forces between said free end faces and the engaged surfaces.

2. A support device according to claim 1 wherein at least said end faces are formed of a water-repellant material adhering without residue.

3. A support device according to claim 2 wherein said water-repellant material comprises polyvinyl siloxane.

4. A support device according to claim 1 wherein each said end face has a contact surface adjoining the engaged surfaces.

5. A support device according to claim 1 wherein said projections are arranged at least one of regularly and irregularly on said backing with a surface density of 10,000 to 60,000 projections per square centimeter of a surface of said backing.

6. A support device according to claim 5 wherein said surface density is 20,000 to 45,000 projections per square centimeter.

7. A support device according to claim 6 wherein said surface density is approximately 30,000 projections per square centimeter.

8. A support device according to claim 1 wherein said projections integrally adjoin said backing.

9. A support device according to claim 1 wherein said projections are formed on parts of at least one of a hand protection.

10. A support device according to claim 1 wherein said backing comprises a film.

11. A support device according to claim 10 wherein said film is joined to parts of one of a hand and a hand protection by an adhesive bond.

12. A support device according to claim 10 wherein pieces of said film are arranged on selective regions of one of a hand and a hand protection and isolated from one another.

13. A support device according to claim 12 wherein at least one of said pieces of said film are located in each fingertip region on an inside of one of said hand and said hand protection.

14. A support device according to claim 12 wherein at least one of said pieces of said film are on a palm of the hand.

15. A support device according to claim 14 wherein said at least one of said pieces of said film is in a region of a ball of a thumb.

16. A support device according to claim 12 wherein at least one of said pieces of said film is on a back of the hand protection.

17. A support device according to claim 16 wherein said at least one of said pieces of said film is in a region of fingers.

18. A support device according to claim 10 wherein said film forms all of a glove for a humanoid hand.

19. A support device according to claim 18 wherein said film is formed into said glove by blow molding.

* * * * *